Aug. 25, 1925.
M. N. WILLIAMS ET AL
1,551,448
RADIUS ROD SUPPORTING MEANS
Filed May 12, 1924
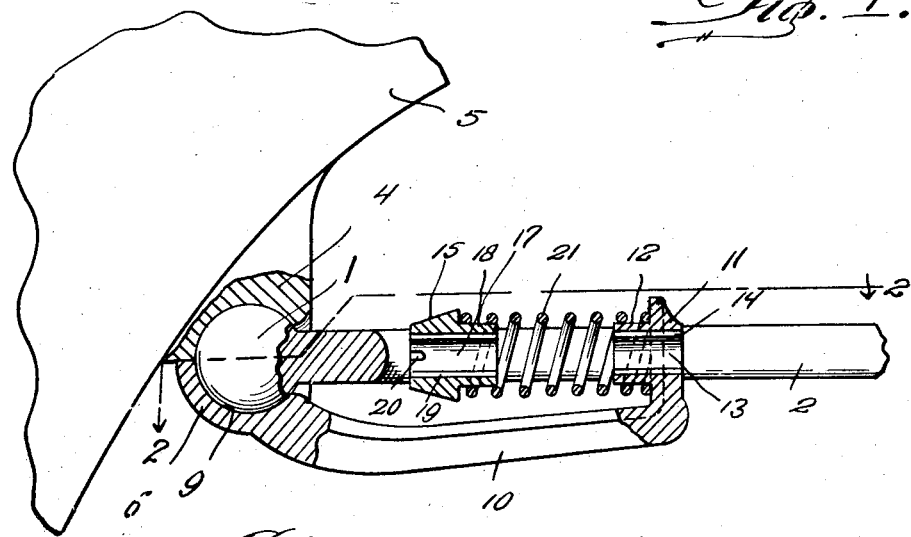
Fig. 1.
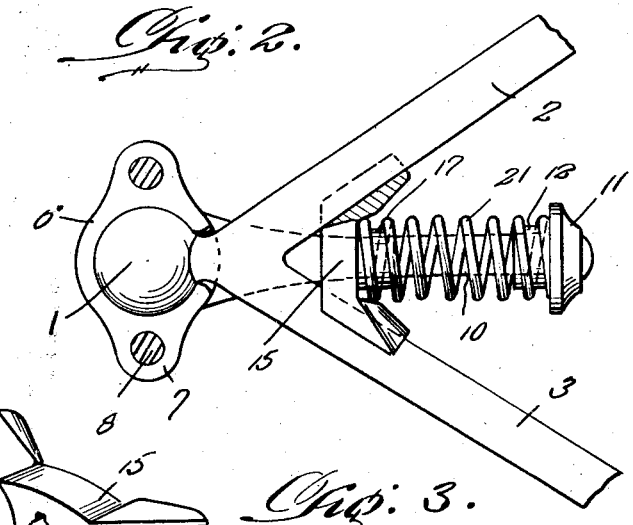
Fig. 2.
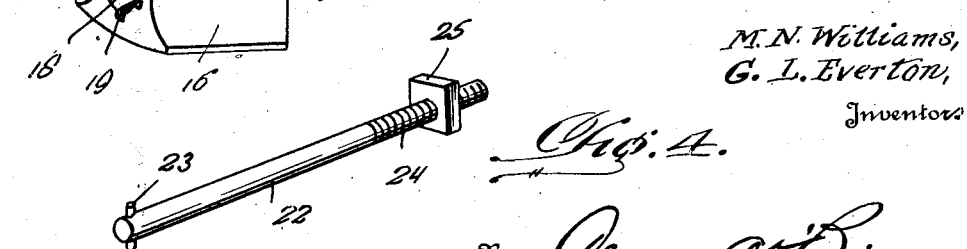
Fig. 3.
Fig. 4.
M. N. Williams,
G. L. Everton,
Inventors
By Clarence A. O'Brien
Attorney Patented Aug. 25, 1925.

1,551,448

UNITED STATES PATENT OFFICE.

MARION N. WILLIAMS AND GEORGE L. EVERTON, OF BEULAVILLE, NORTH CAROLINA.

RADIUS-ROD-SUPPORTING MEANS.

Application filed May 12, 1924. Serial No. 712,786.

*To all whom it may concern:*

Be it known that we, MARION N. WILLIAMS and GEORGE L. EVERTON, citizens of the United States, residing at Beulaville, in the county of Duplin and State of North Carolina, have invented certain new and useful Improvements in a Radius-Rod-Supporting Means, of which the following is a specification.

This invention relates to new and useful improvements in means for supporting the ball shaped head on the converging rear ends of a radius rod preferably of the Ford type.

One of the important objects of the present invention is to provide a supporting means of the above mentioned character, which will normally hold the ball shaped head of the radius rod in the socket provided therefor and which is supported by the crank case, resilient means being provided for urging the head of the radius rod rearwardly into the socket.

A still further object of the invention is to provide a supporting means of the above mentioned character, which is of such a construction as to enable the same to be readily and easily disassembled whenever necessary, a tool being provided for use in connection with the supporting means for facilitating the disassembling of the several parts.

A still further object is to provide a supporting means of the above mentioned character, which is simple in construction, inexpensive, strong and durable and furthermore adapted for the purposes for which it is designated.

Other objects and advantages of this invention will become apparent during the course of the following description.

In the accompanying drawing forming a part of this specification and in which like numerals designate like parts throughout the same:

Figure 1 is a side elevation with parts shown in section of the present invention.

Figure 2 is a sectional view taken approximately on line 2—2 of Figure 1.

Figure 3 is a detail perspective view of the radius rod engaging head, and

Figure 4 is a detail perspective view of the tool used in disassembling the device In the drawing wherein for the purpose of illustration is shown the preferred embodiment of our invention, the numeral 1 designates the ball shaped head which is provided on the converging rear ends of the radius rods 2 and 3 respectively. The head is normally seated in the socket 4 provided therefor and the latter is mounted on the crank case 5 in the usual manner. Ordinarily the ball shaped head 1 of the radius rod is supported in the socket 4 by means of a cap which is fastened to the under side of the socket and is provided with a concaved portion to conform to the shape of the ball shaped head.

With the sockets and caps now in use upon Ford automobiles, the ball shaped head of a radius rod will in the course of time wear against the inner faces of the socket and cap and will become disengaged therefrom or further cause the head to fit loosely within the socket and cap. In order to prevent the displacement of the ball shaped head of the radius rod from the socket and cap provided therefor and to further insure the proper positioning and supporting of the same within the socket and cap, we provide a supporting means the construction of which will be presently described.

Cooperating with the socket 4 is the cap 6, the same being provided with the usual extensions 7 at the ends thereof for receiving the fastening bolts 8 whereby the cap is secured in position on the under side of the socket member. The cap is provided with a cavity 9 for receiving the lower portion of the ball shaped head 1 in the manner clearly illustrated in Figure 1. Extending forwardly from the cap 6 directly below the converging rear ends of the radius rods 2 and 3 and disposed centrally therebetween is the elongated arm 10, the forward edge of which is provided with an upwardly extending portion 11, the latter being disposed between the radius rods 2 and 3 in the manner clearly illustrated in Figure 2 of the drawing.

The upwardly extending portion 11 is enlarged and is provided with a collar 12 on the inner side thereof, the extension and collar being provided with an opening 13. The extension and collar are further provided with diametrically opposed guide grooves 14, the same being adapted to communicate with the opening 13 for the purposes hereinafter to be more fully described.

Adapted to fit between the converging rear ends of the radius rods 2 and 3 is the angular shaped head 15 and the sides thereof are grooved as illustrated at 16 to provide a means for receiving the inner opposed portions of the rods in the manner clearly illustrated in Figure 2. The angular head or block 15 is provided with a collar 17 on the outer face thereof and between the side portions of the same. The collar 17 is adapted to cooperate with the collar 12 extending inwardly from the extension 11 formed on the forward end of the arm 10 in the manner to be presently described. The head 15 and the shoulder 17 provided thereon are provided with an opening 18. The angular head and shoulder are further provided with diametrically opposed guide grooves 19 and the inner end of the angular head is further provided with diametrically opposed notches 20 in the manner clearly shown in Figures 1 and 3 of the drawing, and the purpose of this construction will also be hereinafter more fully described.

Disposed between the extension 11 and the angular head 15 and coiled around the shoulders 12 and 17 respectively is the coil spring 21. The purpose of the coil spring is to normally provide a means for urging the angular head 15 which is in engagement with the converging rear ends of the radius rod rearwardly so that the ball shaped head 2 carried by the converging rear end of the radius rod will be seated within the socket and cap and held in position therein against accidental displacement therefrom. The ball shaped head will be forced rearwardly by the action of the coil spring and the spring will further prevent the ball shaped head from moving forwardly and outwardly from the socket and cap.

Whenever it is desired to disassemble the supporting device to further remove the angular head 15 from engagement with the crotch portion of the radius rod we provide the tool, the construction of which is more clearly shown in Figure 4 of the drawing. The tool comprises an elongated rod 22 one end of which carries thereon the transversely extending pin 23, the ends of which extend through the rod in the manner clearly shown in the drawing. The opposite end of the rod is threaded as illustrated at 24 and receives thereon the nut 25.

In use, the rod is inserted into the opening 13 of the extension 11 and the collar 12 formed thereon so that the pin 23 will be received in the diametrically arranged guide grooves 14 whereby the rod may be freely inserted through the extension and collar and through the coil spring. The ends of the transverse pin 23 are further adapted to pass through the diametrically opposed guide grooves 19 provided in the angular head 15 and after the pin 23 has extended through the collar 17 and the angular end 15, the rod is turned so that the ends of the pin 23 are received in the diametrically opposed notches 20 so that the pin will be seated in the angular head and will cause the same to be forwardly out of engagement with the crotch portion of the radius rod through the medium of the nut 25 which is turned on the threaded end 24 of the rod. After the angular head has been disengaged from the radius rods 2 and 3, the same may be readily removed and the tool disengaged therefrom.

It will thus be seen from the foregoing description, that a radius rod supporting means has been provided which will insure the supporting of the ball shaped head of the radius rod in proper position in the socket provided therefor and furthermore the angular shaped head and the coil spring will normally urge the ball shaped head rearwardly into the socket so as to prevent the forward movement thereof and the displacement of the socket.

The simplicity of our device enables the same to be manufactured at a very low cost and may be readily placed upon radius rods now in use on automobiles of the Ford type in a simple and efficient manner. Furthermore the provision of a radius rod supporting means of the above mentioned character, will be strong and durable.

While we have shown the preferred embodiment of our invention, it is to be understood that various changes in the size, shape and arrangement of parts may be resorted to without departing from the spirit of the invention and the scope of the appended claims.

Having thus described the invention, what we claim is:—

1. In combination with the ball shaped head on the converging rear ends of a radius rod, and the socket provided therefor, of a cap secured to the socket and provided with a cavity for receiving the lower portion of the ball shaped head, an arm extending forwardly from the cap, an extension formed on the forward end of the arm and disposed upwardly between the radius rod, a block disposed between the converging rear ends of the radius rod, and a coil spring between the extension on the forward end of the arm and said block for normally urging the same into engagement with the converging rear end of the radius rod and for retaining the ball shaped head within said socket.

2. In combination with the ball shaped head on the converging rear ends of a radius rod, and the socket provided therefor, of a cap secured to the socket and provided with a cavity for receiving the lower portion of the ball shaped head, an arm extending forwardly from the cap, an extension formed on the forward end of the arm and disposed upwardly between the radius rod, a block disposed between the converging rear ends of the radius rod, a coil spring between the extension on the forward end of the arm and said block for normally urging the same into engagement with the converging rear end of the radius rod and for retaining the ball shaped head within said socket, and means for moving the block out of engagement with the radius rod.

3. In combination with the ball shaped head of the converging rear ends of a radius rod, and the sockets provided therefor, of means for retaining the head in said socket comprising a cap secured to the under side of the socket and provided with a cavity for receiving the lower portion of the head, an arm extending forwardly from the cap, an extension formed on the forward end of the arm and disposed upwardly between the radius rod, a shoulder formed on the inner side of said extension, an angular shaped head fitting between the converging rear ends of the radius rod, a shoulder formed on the outer side of the block, and a coil spring disposed between said extension and said block and having the ends thereof extending around said shoulder for normally urging the block into engagement with the converging ends of the radius rod to retain the ball shaped head in a rearward position in said socket.

In testimony whereof we affix our signatures.

GEORGE L. EVERTON.
MARION N. WILLIAMS.